United States Patent Office 3,533,842
Patented Oct. 13, 1970

3,533,842
PROCESS FOR IMPREGNATING SINTERED
NICKEL PLAQUES
Anthony Christopher Hart, Dudley, England, assignor to
The International Nickel Company, Inc., New York,
N.Y., a corporation of Delaware
No Drawing. Filed June 18, 1969, Ser. No. 834,503
Claims priority, application Great Britain, July 9, 1968,
32,653/68
Int. Cl. H01m 43/04, 35/18
U.S. Cl. 136—29                                7 Claims

ABSTRACT OF THE DISCLOSURE

Process for producing positive plates for alkaline storage batteries in which sintered nickel plaques are impregnated with a nickel active mass (hydrated nickel oxide) by immersing the sintered plaques in a boiling concentrated aqueous solution of nickel nitrate and urea.

---

The present invention is directed to the preparation of positive plates suitable for use in alkaline storage batteries.

Nickel battery plates for use in alkaline accumulators may be made from mesh or other open structure of nickel, or of other inert metal, onto which nickel powder has been sintered to form nickel plaques. It is known that nickel plaques can be converted into hydrated nickel oxide electrodes by chemical means, the conventional method being to vacuum impregnate the plaque with concentrated nickel nitrate solution and then to treat the plaque with a concentrated solution of potassium hydroxide and to repeat these two steps until the desired capacity is obtained (Fleischer method). Alternatively, a hydrated nickel oxide electrode may be formed by cycling a partially impregnated nickel oxide plaque in a concentrated solution of potassium carbonate (Okinaka process) or by cathodic precipitation from a concentrated nickel nitrate solution (McHenry process).

Hereinafter, the hydrated nickel oxide (or nickel hydroxide) formed as the activating material for the positive battery plates is designated the "nickel active mass."

It is an object of the present invention to provide an improved process for producing nickel battery plates impregnated with a nickel active mass which materially reduces the number of deposition cycles required as compared to prior processes.

It is a further object of the invention to provide a process for producing nickel battery plates substantially completely impregnated with a nickel active mass.

Other objects and advantages of the invention will become apparent from the following description.

Broadly stated, the present invention is directed to the treatment of porous nickel plaques to impregnate the pores thereof with a nickel active mass using substantially fewer deposition cycles than prior processes comprising immersing a porous nickel plaque in a boiling concentrated aqueous solution comprising nickel nitrate and urea to obtain an initial deposit of a nickel active mass on and in the plaque, and repeating the deposition step with fresh solution to obtain the desired amount of nickel active mass.

More specifically, a nickel plaque consisting of an open structure of nickel, or other inert metal onto which nickel powder has been sintered, is immersed in a concentrated aqueous solution containing nickel nitrate and urea. The solution is heated to bring it to a boil and this boiling results in the hydrolysis of the urea with the formation of ammonia, a consequent rise in the pH of the solution and the deposition of nickel active mass in and on the plaque. The plaque may be maintained in the boiling solution for from about 60 minutes to about 180 minutes. The chemical reactions involved are believed to occur as follows:

$$CO(NH_2)_2 + H_2O \rightarrow NH_3 + CO_2$$
$$2NH_3 + 2H_2O \rightarrow 2NH_4^+ + 2OH^-$$
$$Ni^{++} + 2OH^- \rightarrow Ni(OH)_2$$

After the deposition step, the plaque may then be removed from the solution, rinsed in deionized water and dried in an oven for about 45 to about 75 minutes, e.g., 1 hour, at about 80° C. to about 105° C., e.g., 100° C., and the process repeated with fresh solution; the process may be repeated as many times as desired. Two cycles of deposition according to the invention have been found to deposit such quantity of nickel active mass onto a 3 mm. thick plaque that the battery plate thus formed will have a capacity greater than 7 ampere hours per dm.$^2$, whereas conventional processes require at least seven cycles to achieve this capacity. A battery plate having a capacity of 2.2 ampere hours per dm.$^2$ has been obtained from a 1 mm. thick plaque after two deposition cycles.

The change of pH in the solution on boiling may be from as low as 3.5 to as high as 6.0; in general we have found that the initial solution will have a pH of about 3.9, and the pH after boiling will be about 5.7.

Highly acceptable results are obtained if the concentration of nickel nitrate [Ni(NO$_3$)$_2$·6H$_2$O] in the solution is at least 800 g./l. (grams per liter), the range of from 800 g./l. to 1000 g./l. being advantageous. If solutions containing less than 800 g./l. of nickel nitrate are used, then the amount of active mass deposited and therefore, the resultant capacity of the plate, is substantially decreased. The concentration of urea should preferably be at least 104 g./l., with the range of from 104 g./l. to 208 g./l. being most advantageous. However, the nickel nitrate concentration may be as great as the amount necessary to saturate the solution and the concentration of urea as great as 312 g./l. without serious adverse effect on the desired reaction.

The sintered nickel plaques employed in making the battery plates in accordance with this invention must be porous in order that they may have a large area upon which the nickel active mass may be deposited. For example, they should have a porosity from 50% to 90%. They will generally have a thickness of not more than a few mm. e.g., from less than 1 mm. to about 4 mm. They may be made by any suitable sintering method. Thus, they may be made by loose sintering, by slurry technique, or by roll compaction. In addition, the plaques often contain a reinforcing screen or gauze preferably made of nickel wire, or expanded nickel sheet.

By way of example, a concentrated aqueous solution containing 1000 grams per liter of nickel nitrate and 208 grams per liter of urea was prepared. The pH of the solution was 3.9. Sintered nickel plaques were employed, the plaques having a porosity of about 80% and being 3 mm. thick, 5 cm. wide and 5 cm. long. A set of plaques was immersed in the solution and the solution was brought to a boil (220° F.). The plaques were maintained in this boiling solution for about 120 minutes. The plaques were then removed from the solution, rinsed in deionized water and dried in an oven for about 60 minutes at about 100° C. The pH of the spent solution was 5.7. Fresh solution was then employed, the plaques were immersed therein and the deposition step was repeated after bringing the solution to a boil. Following the second deposition step, the plaques were removed from the solution, rinsed and dried as before. The plaques were examined and were found to have a nickel active mass thereon in the amount of 5.5 grams. When tested, one such plate had a capacity of 7 ampere hours per dm.² at a discharge rate of up to 2 amperes per dm.².

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:
1. In a process for preparing positive plates for alkaline storage batteries wherein sintered nickel plaques are impregnated with a nickel active mass, the improvement comprising the steps of:
   (1) immersing the sintered nickel plaques in a boiling concentrated aqueous solution of nickel nitrate and urea,
   (2) withdrawing the plaques from the solution and rinsing them,
   (3) drying the plaques and
   (4) repeating steps 1 to 3 at least once to impregnate said plaques with nickel active mass.

2. The process of claim 1 wherein the solution has an initial pH of at least 3.5 and after boiling has a pH of no more than 6.0.

3. The process of claim 2 wherein the solution has an initial pH of about 3.9 and the pH of the solution after boiling is about 5.7.

4. The process of claim 1 wherein the solution contains nickel nitrate in an amount up to the saturation point and urea is present in a concentration of up to 312 grams per liter.

5. The process of claim 4 wherein the solution includes from about 800 grams per liter to about 1000 grams per liter of nickel nitrate and from about 104 grams per liter to about 208 grams per liter of urea.

6. The process of claim 5 wherein the nickel plaques are maintained in the boiling solution from about 60 to 180 minutes.

7. The process of claim 6 wherein the plaques are rinsed in deionized water and dried at a temperature of about 100° C. for a period of from about 45 to about 75 minutes.

References Cited

UNITED STATES PATENTS

| | | | |
|---|---|---|---|
| 2,771,499 | 11/1956 | Fleischer | 136—24 |
| 3,146,130 | 8/1964 | Kroger et al. | 136—34 |
| 3,269,864 | 8/1966 | Ackermann et al. | 136—78 |
| 3,274,028 | 9/1966 | Okinaka et al. | 136—29 |
| 3,335,033 | 8/1967 | Kober | 136—29 |

WINSTON A. DOUGLAS, Primary Examiner

A. SKAPARS, Assistant Examiner

U.S. Cl. X.R.

136—34, 75

PO-1050
(5/69)

UNITED STATES PATENT OFFICE
CERTIFICATE OF CORRECTION

Patent No. __3,533,842__         Dated __October 13, 1970__

Inventor(s) __ANTHONY CHRISTOPHER HART__

It is certified that error appears in the above-identified patent and that said Letters Patent are hereby corrected as shown below:

Column 4, line 9 (second line of claim 6), after "to" insert --about--

Signed and sealed this 17th day of August 1971.

(SEAL)
Attest:

EDWARD M. FLETCHER, JR.
Attesting Officer

WILLIAM E. SCHUYLER, JR.
Commissioner of Patents